US012377659B2

(12) United States Patent
Hamada

(10) Patent No.: US 12,377,659 B2
(45) Date of Patent: Aug. 5, 2025

(54) PRINTING APPARATUS, CONTROL METHOD OF PRINTING APPARTUS, AND STORAGE MEDIUM

(71) Applicant: CANON KABUSHIKI KAISHA, Tokyo (JP)

(72) Inventor: Ryuhei Hamada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/501,166

(22) Filed: Nov. 3, 2023

(65) Prior Publication Data

US 2024/0075747 A1 Mar. 7, 2024

Related U.S. Application Data

(62) Division of application No. 17/238,242, filed on Apr. 23, 2021, now Pat. No. 11,840,094.

(30) Foreign Application Priority Data

May 8, 2020 (JP) ................................. 2020-082441

(51) Int. Cl.
*B41J 2/175* (2006.01)
*B41J 29/393* (2006.01)

(52) U.S. Cl.
CPC ....... *B41J 2/17566* (2013.01); *B41J 2/17506* (2013.01); *B41J 2/17533* (2013.01); *B41J 29/393* (2013.01)

(58) Field of Classification Search
CPC ................ B41J 2/17566; B41J 2/17506; B41J 2/17533; B41J 29/393; B41J 3/46; B41J 29/38; B41J 29/13
See application file for complete search history.

(56) References Cited

U.S. PATENT DOCUMENTS

| | | | |
|---|---|---|---|
| 2004/0183853 | A1 | 9/2004 | Hamasaki |
| 2005/0052510 | A1 | 3/2005 | Ju |
| 2010/0066796 | A1 | 3/2010 | Yanagi |
| 2016/0350637 | A1 | 12/2016 | Kawana |
| 2020/0316973 | A1 | 10/2020 | Toki |

FOREIGN PATENT DOCUMENTS

| | | | |
|---|---|---|---|
| JP | H10-226087 | A | 8/1998 |
| JP | 2006-297640 | A | 11/2006 |
| JP | 2010-194932 | A | 9/2010 |
| JP | 2017-081076 | A | 5/2017 |

OTHER PUBLICATIONS

Nov. 5, 2024 Japanese Official Action in Japanese Patent Appln. No. 2024-017813.

*Primary Examiner* — Jannelle M Lebron
(74) *Attorney, Agent, or Firm* — Venable LLP

(57) ABSTRACT

A printing apparatus on which an ink tank containing ink to be used for printing is mounted, the printing apparatus including: a cover configured to be opened in a case where the ink tank is replaced; an operation unit configured for shifting to a replacement state in which the ink tank can be replaced; and a control unit configured to display a screen for guidance of a user operation for shifting the ink tank to the replacement state on a display unit if the cover is opened in a case where the ink tank can be replaced and shift the ink tank to the replacement state in a case where the operation unit is operated in a state where the screen is displayed on the display unit.

15 Claims, 7 Drawing Sheets

PRINTING APPARATUS, CONTROL METHOD OF PRINTING APPARTUS, AND STORAGE MEDIUM

This application is a divisional of application Ser. No. 17/238,242 filed Apr. 23, 2021.

BACKGROUND OF THE INVENTION

Field of the Invention

The present invention relates to a printing apparatus, a control method of a printing apparatus, and a storage medium.

Description of the Related Art

In an inkjet printing apparatus, ink tanks are often replaced by the user who uses the printer. In Japanese Patent Laid-Open No. 2006-297640 (hereinafter referred to as Document 1), there is disclosed a technique for automatically changing notification and control regarding ink tank replacement according to usage place or purpose information of the user who uses the inkjet printing apparatus.

In the technique of Document 1, to perform notification and control for ink tank replacement at an appropriate timing for replacement is not taken into consideration.

SUMMARY OF THE INVENTION

The printing apparatus according to an embodiment of the present invention is a printing apparatus on which an ink tank containing ink to be used for printing is mounted, the printing apparatus including: a cover configured to be opened in a case where the ink tank is replaced; an operation unit configured for shifting to a replacement state in which the ink tank can be replaced; and a control unit configured to display a screen for guidance of a user operation for shifting the ink tank to the replacement state on a display unit if the cover is opened in a case where the ink tank can be replaced and shift the ink tank to the replacement state in a case where the operation unit is operated in a state where the screen is displayed on the display unit.

Further features of the present invention will become apparent from the following description of exemplary embodiments with reference to the attached drawings.

DESCRIPTION OF THE EMBODIMENTS

Hereinafter, a detailed explanation will be given of preferred embodiments of the present invention with reference to the accompanying drawings. The same sign is assigned for explanations of the same configuration. In addition, the relative positions, shapes, etc., of the constituent elements described in the embodiments are merely examples.

First, replacement of an ink tank in an inkjet printing apparatus (hereinafter simply referred to as a printing apparatus) will be schematically explained. Then, the configuration of the printing apparatus of the present embodiment will be explained.

Although there are various ink tank replacement systems for a printing apparatus depending on the printer manufacturer, the model, etc., the ink tank replacement systems are roughly categorized into the following methods.

Case (1): if the user opens an open/close cover of the printing apparatus and the carriage is exposed, the carriage automatically moves to the tank replacement position, so that the tank can be replaced by the user.

Case (2): if the user presses a predetermined key after opening an open/close cover of the printing apparatus, the carriage thereby moves to the tank replacement position.

Case (3): if the user presses an ink replacement button, the carriage thereby moves to the tank replacement position, and, thereafter, the user opens an open/close cover of the printing apparatus and replaces the tank.

Here, some printing apparatuses of which control is triggered by a predetermined key operation by the user as in the above-described cases (2) and (3) are equipped with a pigment ink. Pigment inks have a characteristic of drying and solidifying more easily than dye inks. Further, since the print head is not capped with a cap in a state where the carriage is moving to the tank replacement position, inks are in a state of drying easily. Moreover, the operation of opening the open/close cover by the user is not always performed for the purpose of replacing an ink tank.

Therefore, in a case where the open/close cover is opened by the user for a purpose other than replacing an ink tank, control that is triggered by a predetermined key operation by the user is performed so as not to move the carriage to the ink replacement position.

However, in a case where the open/close cover is opened by the user in the above-described case (2), the user is not sure whether tanks are currently in a replaceable state. Therefore, in the present embodiment, an explanation is given of a printing apparatus that does not immediately move the carriage to the tank replacement position in conjunction with the open/close cover but provides the user with a notification at an appropriate timing for replacement and requests for a predetermined operation.

<Outer Appearance of the Printing Apparatus>

Figure 1A:
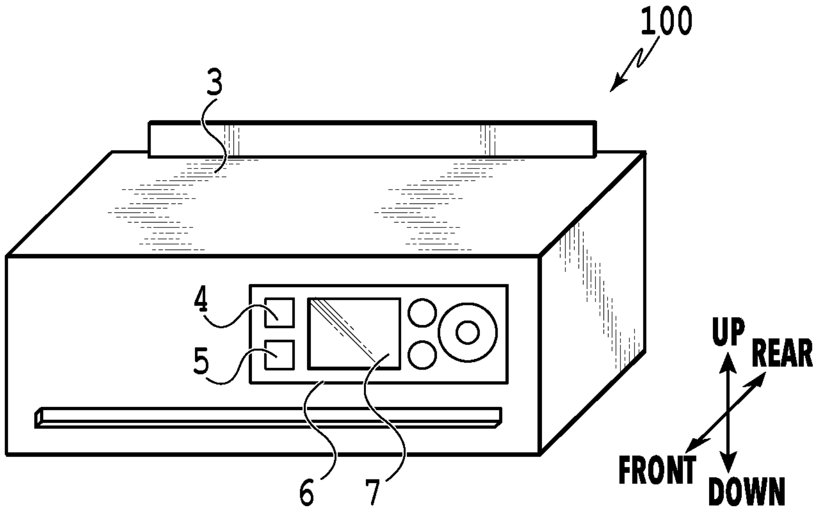
FIG. 1A through FIG. 1C are diagrams illustrating the outer appearance of a printing apparatus.
Figure 1B:
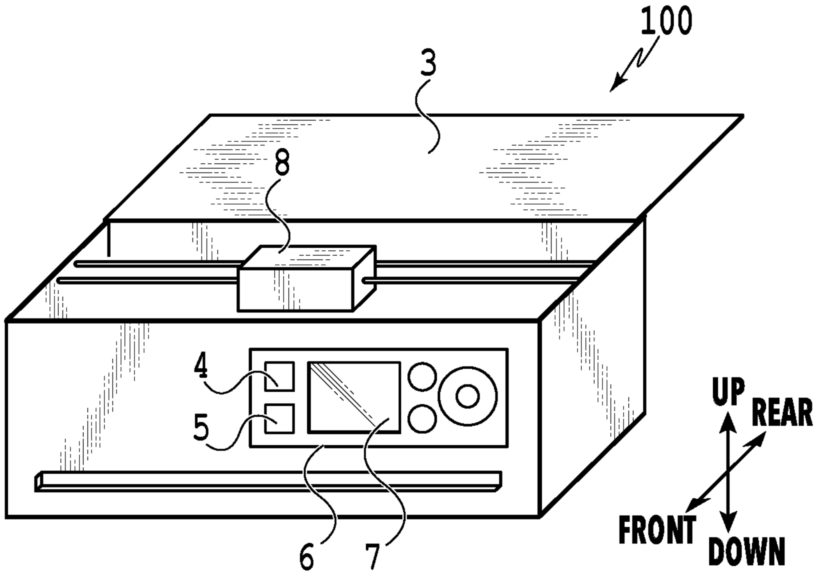
Figure 1C:
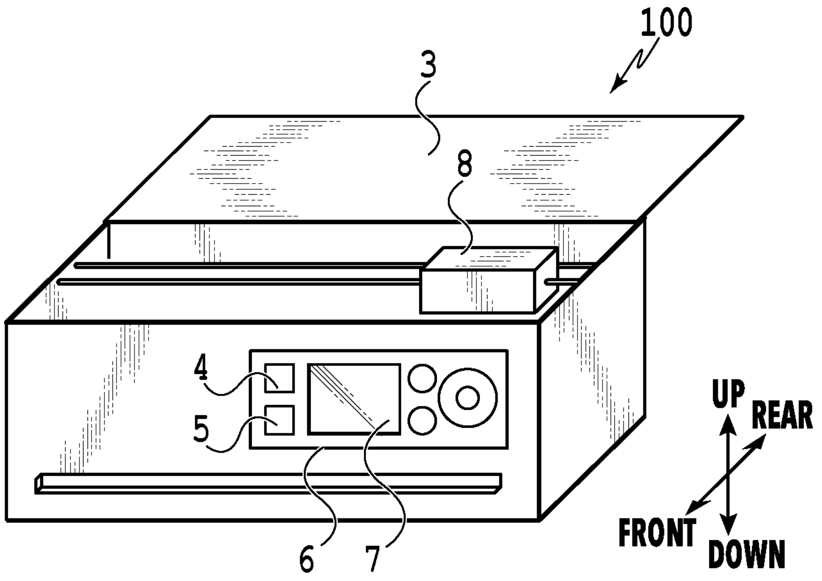

FIG. 1A through FIG. 1C are diagrams illustrating the outer appearance of the printing apparatus 100 in the present embodiment. In FIG. 1A, a state where the cover 3, which is an open/close cover, is closed is illustrated. In FIG. 1B and FIG. 1C, a state where the cover 3 is opened is illustrated. In FIG. 1B, a state where the carriage 8 has moved to the tank replacement position is illustrated. In FIG. 1C, a state where the carriage 8 has moved to (been positioned at) the home position, which is the standby position (also referred to as the initial position).

As illustrated in FIG. 1A through FIG. 1C, an operation panel 6 is arranged on the front surface of the apparatus case. On the operation panel 6, a liquid crystal display device (hereinafter referred to as an LCD) 7, which is a display unit, and a hard key group, such as a power supply ON/OFF key 4 (power supply ON/OFF button) and a reset key 5 (reset button), are arranged. The cover 3 is disposed on the upper part of the apparatus case. The cover 3 is arranged so as to cover the scanning area of the print head 1 (see FIG. 2), which is mounted on the carriage 8. The cover 3 is opened and closed for attachment, replacement, maintenance, etc., of the ink tank 2 (see FIG. 2) and the print head 1.

Figure 2:
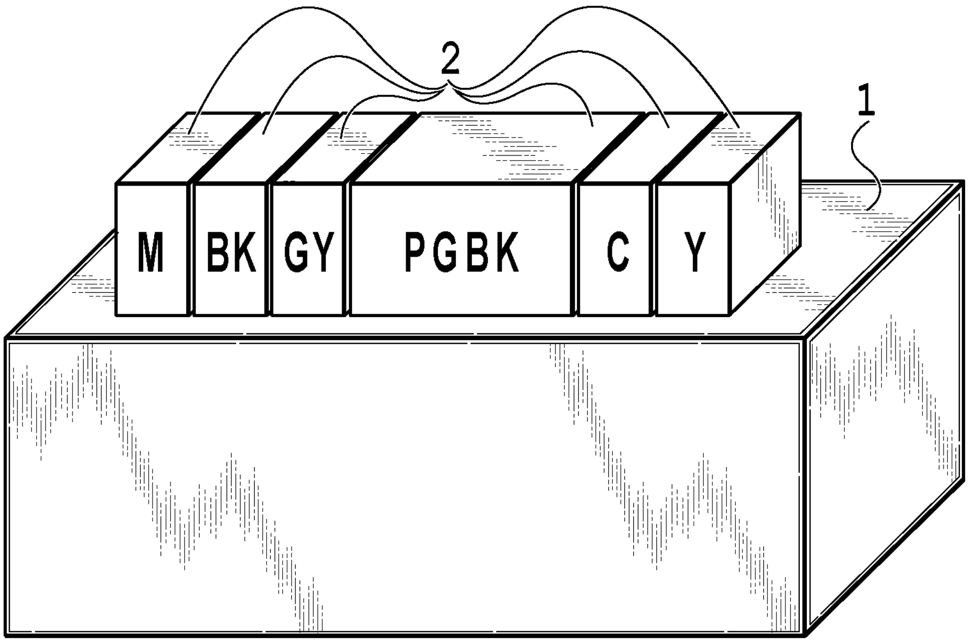
FIG. 2 is a schematic diagram of a configuration in the vicinity of a print head.

FIG. 2 is a schematic diagram of the configuration in the vicinity of the print head 1 of the printing apparatus 100. The print head 1 is mounted on the carriage 8. In FIG. 2, an example of a type of print head for which an ink tank 2 is separated from the print head 1 and replaced is illustrated. On the print head 1 of the present embodiment, multiple ink tanks 2 can be mounted. On the print head 1 in the example of FIG. 2, a dye magenta ink, cyan ink, yellow ink, black ink, and gray ink, and a pigment black ink are mounted. The print head 1 is mounted on the carriage 8, so that scan for printing is performed together with reciprocal movement of the carriage 8. Regarding the ink tank 2 of the present embodiment, it is possible to replace a tank independently in a case where ink is consumed. In the present embodiment, an ink tank that contains a pigment black ink is mounted on the print head 1. Therefore, as described above, in a case where the user opens the cover 3 for a purpose other than replacing the ink tank 2, the carriage 8 is configured not to move in conjunction with the cover 3 in order to prevent the ink from drying. In the printing apparatus 100 of the present embodiment, ink replacement is performed with such control as in the above-described case (2). That is, if the user presses a predetermined key after opening the cover 3 of the printing apparatus 100, the carriage 8 thereby moves to the tank replacement position as illustrated in FIG. 1B. The predetermined key can be a given key according to the printing apparatus 100. In the present embodiment, it is assumed that the predetermined key is the reset key 5. Although not illustrated in FIG. 1A through FIG. 1C, other keys such as a start key, a stop key, or another given key can be set as the predetermined key.

Figure 3:
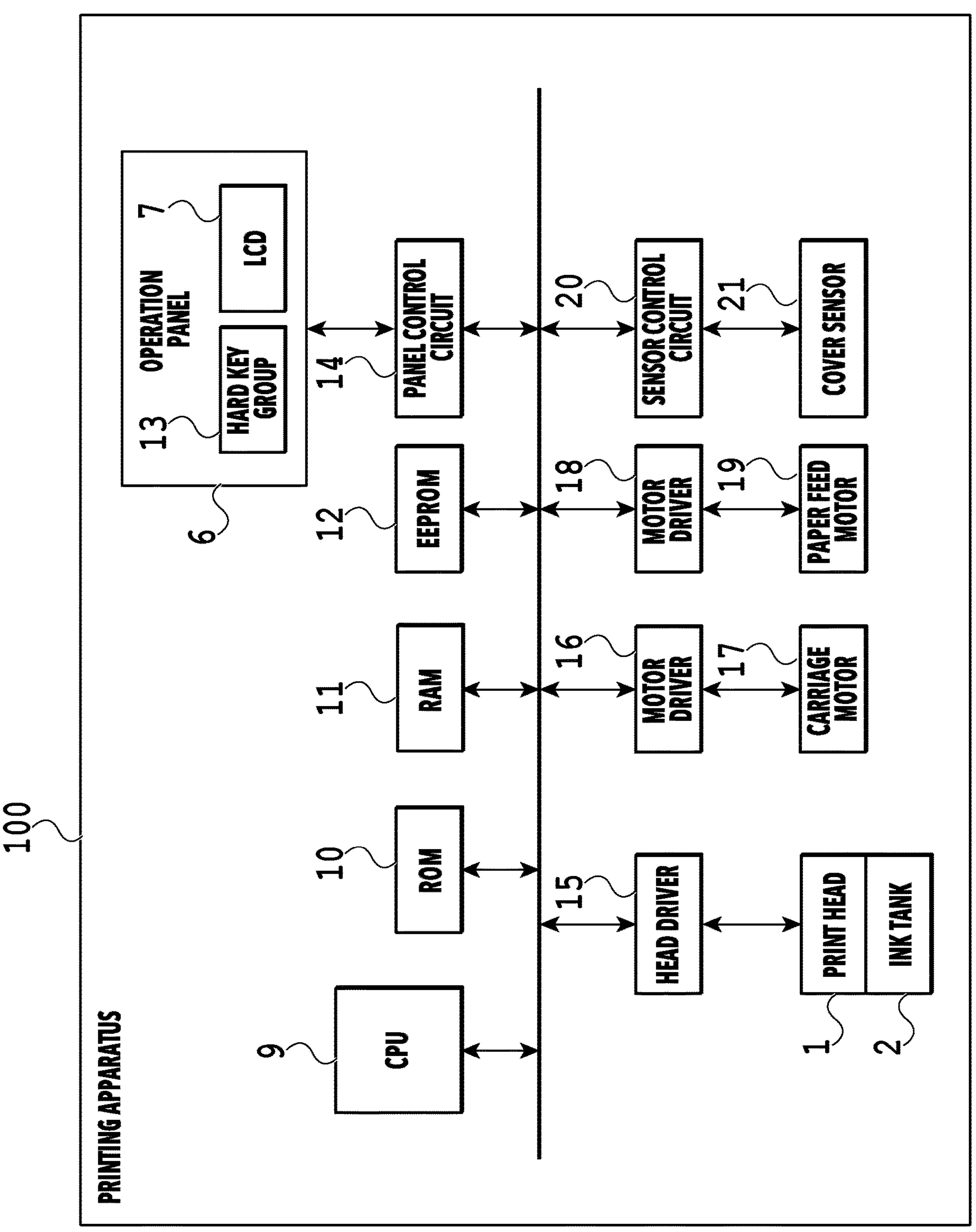
FIG. 3 is a diagram illustrating a configuration of a control system of the printing apparatus.

FIG. 3 is a diagram illustrating a configuration of a control system of the printing apparatus 100 of the present embodiment. In FIG. 3, the CPU 9 executes control processing, data processing, etc., for operation of each unit of the printing apparatus 100. The ROM 10 stores control programs for various kinds of processing executed by the CPU 9. Further, the control program explained in the later-described flowchart are also stored in the ROM 10. The RAM 11 is used as a work area for executing various kinds of processing performed by the CPU 9. The EEPROM 12 stores setting information required for the printing operation.

The ink ejection operation of the print head 1 is performed if the CPU 9 supplies drive data and a drive control signal for an electrothermal converter to the head driver 15. Film-boiling of ink occurs due to heat energy generated by the electrothermal converter disposed in the print head 1, so that ink is ejected from an ejection port. It is also possible to use a print head that performs an ink ejection operation in a piezoelectric system. The head driver 15 is configured to be capable of controlling input and output of information for the EEPROM 12 of an ink tank.

Further, the CPU 9 controls the carriage motor 17 for moving the carriage 8 and the paper feed motor 19 for rotating a roller unit and controls driving of the print head 1, so as to control printout. The CPU 9 controls the carriage motor 17 via the motor driver 16 and controls the paper feed motor 19 via the motor driver 18. The motor driver 16, the motor driver 18, and the head driver 15 configure a printing unit I/F. The carriage motor 17, the paper feed motor 19, and the print head 1 configure a printing unit.

Further, the CPU 9 controls the operation panel 6 disposed on the front surface of the printing apparatus 100 via the panel control circuit 14. The CPU 9 is capable of displaying desired information on the LCD 7 which is arranged on the operation panel 6 and is capable of monitoring operations which are performed by the user to the hard key group 13 on the operation panel 6.

The sensor control circuit 20 detects the opened or closed state of the cover 3 by use of the cover sensor 21 and notifies the CPU 9 of the opened or closed state of the cover 3.

<Flowchart>

Figure 4:
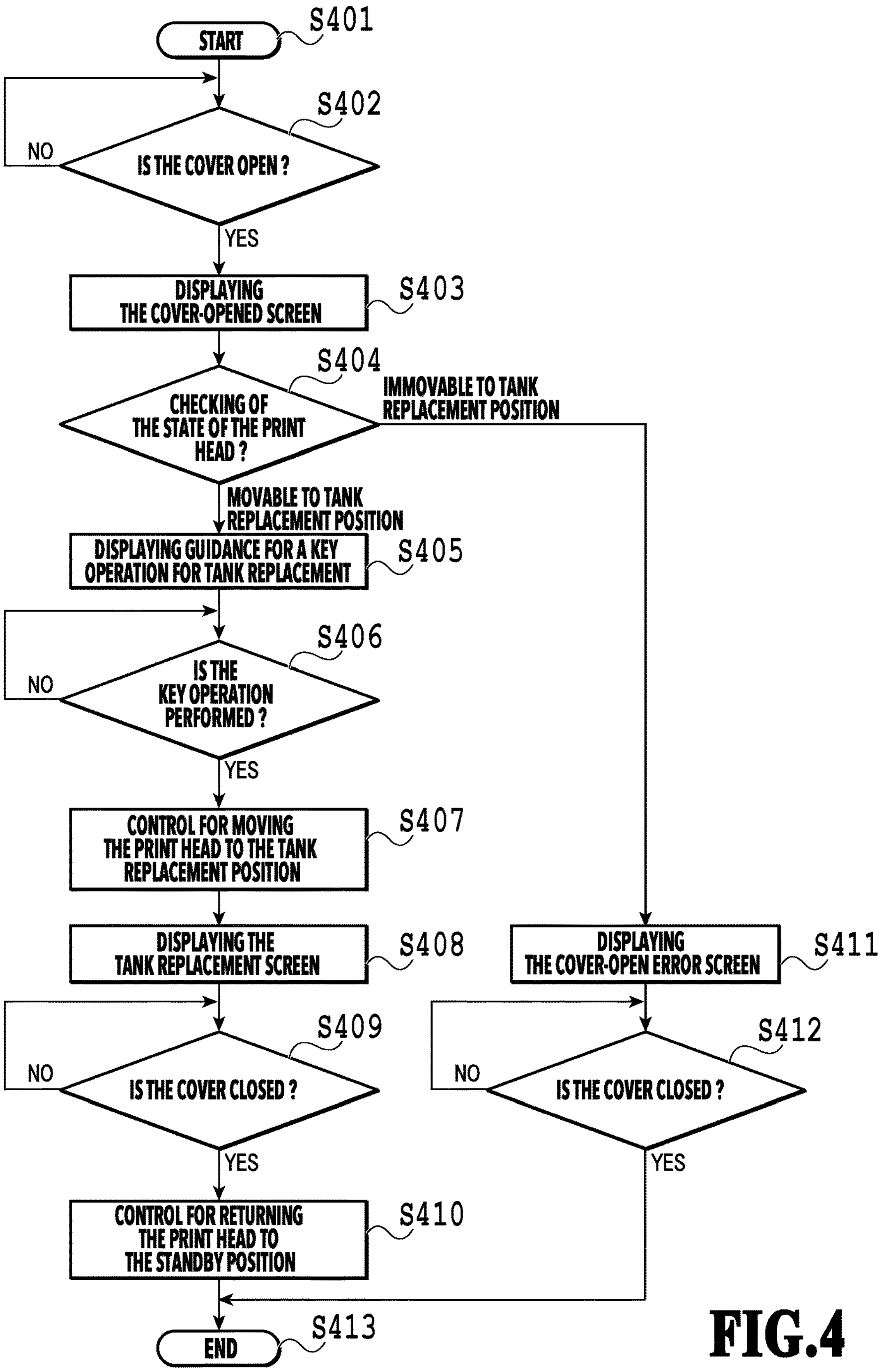
FIG. 4 is a flowchart illustrating an example of control processing.

FIG. 4 is a flowchart illustrating an example of control processing in the present embodiment. FIG. 5A through FIG. 5D are diagrams illustrating examples of a display screen to be displayed on the LCD 7. Hereinafter, the control processing of the present embodiment will be explained with reference to the flowchart of FIG. 4 as well as FIG. 5A through FIG. 5D. The control processing illustrated in FIG. 4 is performed by the CPU 9 of the printing apparatus 100 executing a control program stored in the ROM 10, etc. The symbol "S" in the explanation of each process means that it is a step in the flowchart (the same applies hereinafter to the present specification). The processing illustrated in FIG. 4 is performed after the power supply of the printing apparatus 100 is turned on. Further, in FIG. 4, the processing of user interface control of the present embodiment is mainly illustrated, and the processing control of other operations such as the printing operation is omitted.

Upon starting the processing in S401, the CPU 9 determines in S402 whether the cover 3 is open. That is, whether the cover 3 is opened by the user, etc., is determined. Whether or not the cover 3 is open can be detected by the cover sensor 21. If the cover 3 is open, the processing proceeds to S403, and, if not, the determination of S402 is repeated.

Figure 5A:
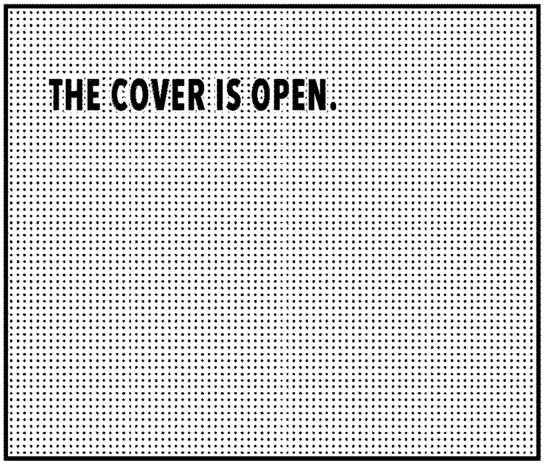
FIG. 5A through FIG. 5D are diagrams illustrating examples of a display screen.

In S403, the CPU 9 displays a cover-opened screen on the LCD 7 of the operation panel 6. In FIG. 5A, an example of the cover-opened screen is illustrated. On the LCD 7, a notification that the cover is open is provided. Thereafter, the processing proceeds to S404.

In S404, the CPU 9 checks the state of the print head 1. That is, the cover-opened screen is displayed on the LCD 7, and, on the other hand, the state of the print head 1 is checked. Here, it is assumed that the state of the print head 1 is either movable to the tank replacement position or not movable (that is, immovable) to the tank replacement position. In the present embodiment, based on the determination of S404, the subsequent control is roughly divided into two. If movable to the tank replacement position, the processing proceeds to S405. In the present example, in a case where the printing apparatus 100 is on standby, that is, in a case where the printing apparatus 100 has not received a print signal, it is determined to be movable to the tank replacement position. On the other hand, if being immovable to the tank replacement position, the processing proceeds to S411. In the present example, in a case where the printing apparatus 100 is in operation, that is, in a case where a print signal is received and printing is in progress, it is determined to be immovable to the tank replacement position. Further, in a case where the printing apparatus 100 is executing maintenance, it is determined to be immovable to the tank replacement position as well. Each process will be explained below.

<(1) In a Case Where the Printing Apparatus Is on Standby (In a Case Where a Print Signal Is Not Received)>

Figure 5C:
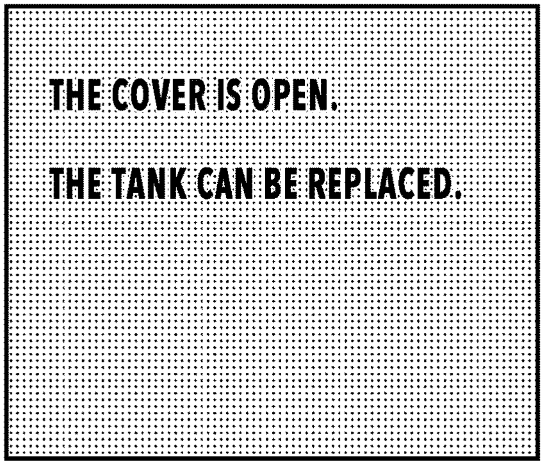
Figure 5B:

In a case where it is determined that the printing apparatus is on standby and is movable to the tank replacement position, the CPU 9 displays a screen for guidance of a key operation for ink tank replacement on the LCD 7 in S405. In FIG. 5B, an example of the screen for guidance of a key operation for ink tank replacement is illustrated. As described above, in the present embodiment, it is assumed that a predetermined key operation for ink tank replacement is performed in a case where the reset key 5 is pressed. Therefore, in FIG. 5B, a notification is provided for pressing the reset key. As described above, in a case where the predetermined key is another key such as a stop key, a notification is provided for pressing that key. Then, after displaying the screen illustrated in FIG. 5B on the LCD 7, the processing proceeds to S406.

In S406, the CPU 9 determines whether the key operation for ink tank replacement is performed. The CPU 9 is capable of detecting whether the key operation is performed via the panel control circuit 14. If the key operation is performed, the processing proceeds to S407, and, if the key operation is not performed, the determination of S406 is repeated. During the determination of S406, the screen illustrated in FIG. 5B is kept being displayed on the LCD 7.

Upon confirming the key operation, in S407, the CPU 9 performs the control for moving the print head 1 to the tank replacement position. That is, via the motor driver 16, the CPU 9 controls the carriage motor 17 that drives the carriage 8 on which the print head 1 is mounted, so as to move the print head 1 from the standby position to the tank replacement position. After moving the print head 1 to the tank replacement position in S407, the CPU 9 displays a tank replacement screen on the LCD 7 in S408. In FIG. 5C, an example of the tank replacement screen is illustrated. In FIG. 5C, a notification that the tank can be replaced is provided. Upon displaying the tank replacement screen, the processing proceeds to S409.

As described above, in the present embodiment, in a case where the cover 3 is opened, the print head 1 is not immediately moved to the tank replacement position. In a case where the print head 1 is in a state of being movable to the tank replacement position at the point in time where the cover 3 is opened, first, the screen for guidance of a key operation for tank replacement is displayed. Accordingly, it is possible to notify the user of an appropriate timing for tank replacement. Further, at this point in time, since the print head 1 is capped with a cap, it is possible to prevent the pigment ink from drying, for example. Then, after the screen for guidance of the key operation for tank replacement is displayed, in a case where the predetermined key operation is received, the print head 1 is moved to the tank replacement position. Since the user performs the predetermined key operation after seeing such a screen for guidance of the key operation as illustrated in FIG. 5B, it is confirmed that the user intends to replace the ink tank 2. By moving the print head 1 from the standby position at this timing, it is possible to move the print head 1 to the tank replacement position at an appropriate timing.

The explanation of the processing of FIG. 4 will be continued. Upon displaying the tank replacement screen in S408, the ink tank 2 is to be replaced by the user. Thereafter, in S409, the CPU 9 determines whether the cover 3 is closed. Whether the cover 3 is closed can be detected by the cover sensor 21. If the cover 3 is closed, the processing proceeds to S410. If the cover is not closed, the determination is repeated in S409. During the determination of S409, the screen illustrated in FIG. 5C is kept being displayed on the LCD 7.

In S410, the CPU 9 performs the control for moving (returning) the print head 1 to the home position, which is the standby position (initial position). Although explanation is omitted in the present flowchart, in a case where an appropriate ink tank 2 is not attached, a screen for a notification thereof can be displayed on the LCD 7. Upon returning the print head to the standby position in S410, the processing proceeds to S413, so as to end the processing of the present flowchart.

With such control, in a case where the user opens the cover 3, it is possible to notify the user of being movable to the ink replacement position and to notify the user of a timing where a key operation can be performed. The user performs the key operation in response to this notification and replaces the ink tank 2. As described above, in the processing of the present embodiment, it is possible for the user to perform the tank replacement work at an appropriate timing, so that the usability can be improved.

<(2) In a Case Where the Printing Apparatus Is in Operation or Under Maintenance>

Figure 5D:
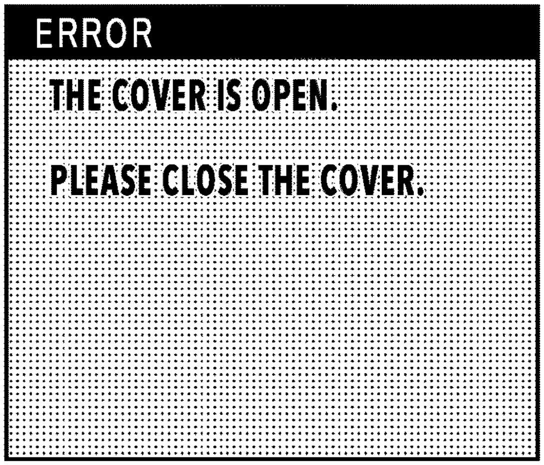

Next, an explanation will be given of an example of the case in which, in S404, it is determined to be immovable to the tank replacement position, that is, the case in which the printing apparatus 100 is in operation (that is, during printing upon reception of a print signal) or under maintenance. In the case where the printing apparatus 100 is in operation or under maintenance, the processing proceeds to S411, so that the CPU 9 displays a cover-open error screen on the LCD 7. In FIG. 5D, an example of the cover-open error screen is illustrated. In FIG. 5D, the user is notified to close the cover 3. In a case where the printing apparatus 100 is in operation where the printing operation is being performed, the ink tank 2 cannot be replaced. Further, in a case where the printing apparatus 100 is performing maintenance processing, the ink tank 2 cannot be replaced as well. In these cases, the carriage 8 is in an operating state. Therefore, in a case where the cover 3 is opened in a state of being immovable to the tank replacement position, the CPU 9 displays the cover-open error screen and stops the operation of the carriage 8. That is, the print processing or the maintenance processing is suspended. Thereafter, the processing proceeds to S412, so that the CPU 9 determines whether the cover 3 is closed. If it is detected in S412 that the cover is closed, the operation before being suspended is continued. That is, the suspended print processing or maintenance processing is resumed. Then, the processing proceeds to S413, so as to end the processing. If the cover 3 is not closed, the processing is repeated in S412. During the processing being repeated in S412, the screen of FIG. 5D is kept being displayed on the LCD 7.

With this control, in a case where the print head 1 is in a state of being not movable to the tank replacement position, such as during print processing and maintenance processing, it is possible to avoid the user from performing an unnecessary operation, such as pressing of a predetermined key, by displaying an error screen. Further, it is possible to guide the user to close the cover 3.

<Processing in the State on Arrival>

Figure 6:
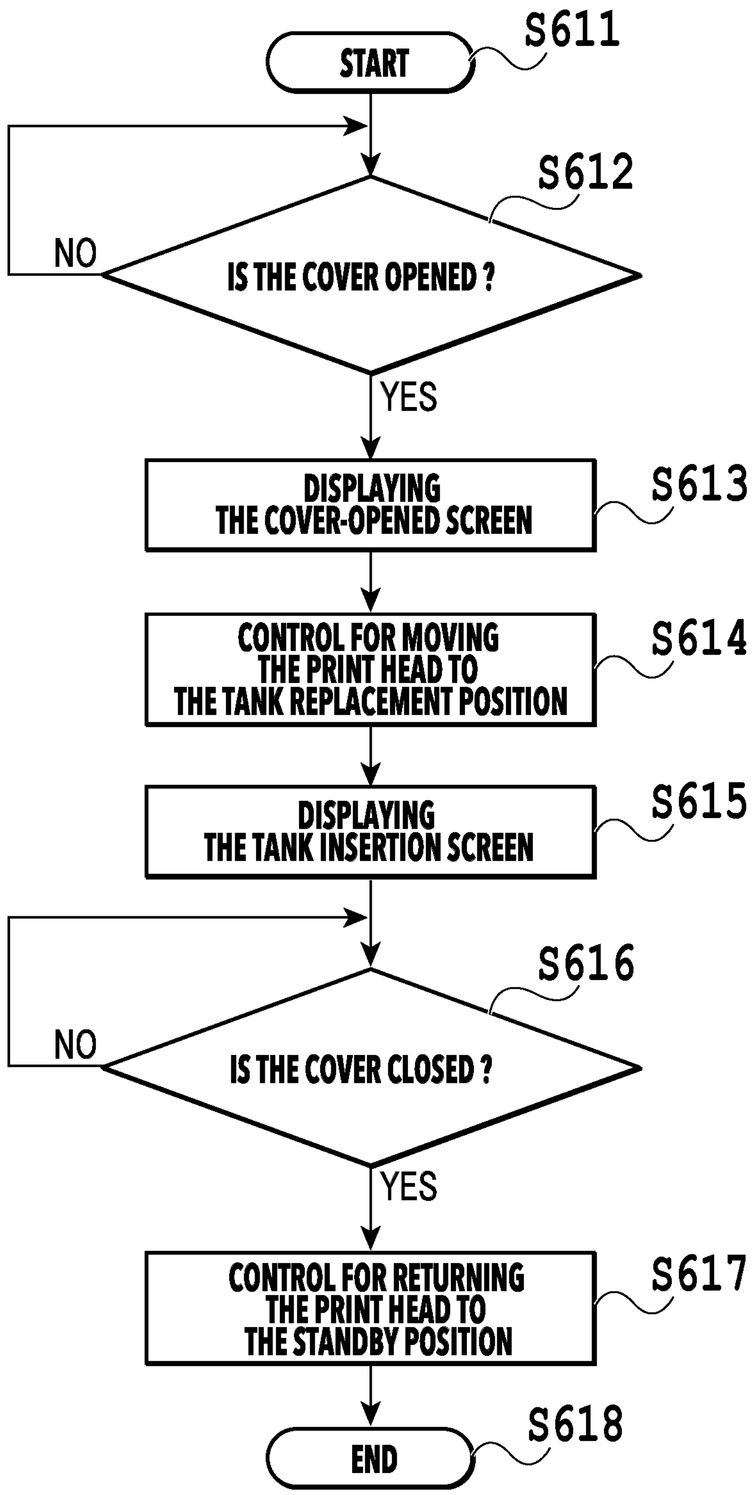
FIG. 6 is a flowchart illustrating control processing in a case of a state on arrival.
Figure 7A:
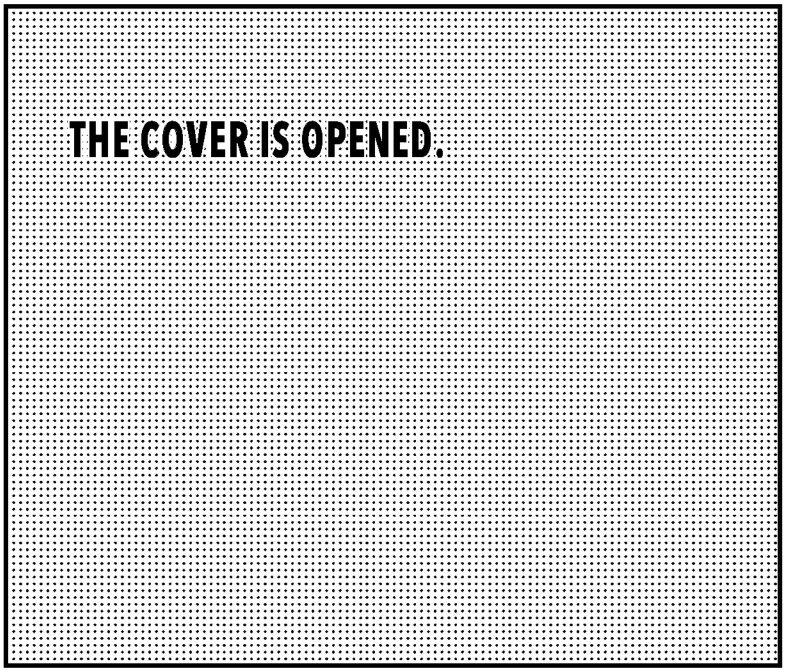
FIG. 7A and FIG. 7B are diagrams illustrating examples of a display screen.
Figure 7B:
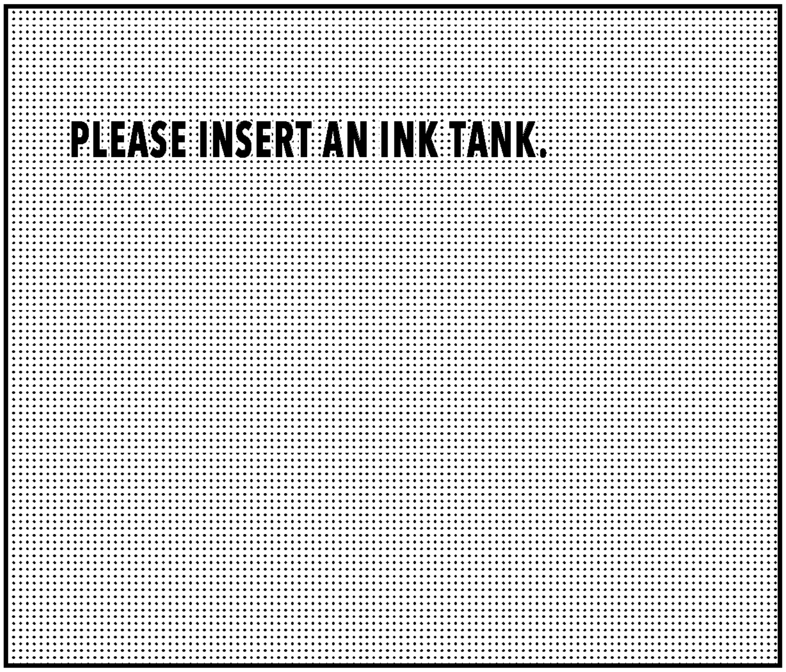

FIG. 6 is a flowchart illustrating the control processing in a case of a state on arrival of the printing apparatus 100 of the present embodiment. FIG. 7A and FIG. 7B are diagrams illustrating examples of a display screen to be displayed on the LCD 7. Hereinafter, the control processing of the present embodiment at the time of arrival will be explained with reference to the flowchart of FIG. 6 as well as FIG. 7A and FIG. 7B. The time of arrival refers to the state immediately after the printing apparatus 100 is shipped. That is, the state on arrival is a state in which the ink tank 2 is not mounted on the carriage 8. Therefore, such a user operation as inserting the ink tank 2 into the empty print head 1 (carriage 8) is performed. Whether the printing apparatus 100 is in the state on arrival can be determined by the CPU 9 referring to an arrival flag stored in the ROM 10 or the EEPROM 12, for example. In S611 of FIG. 6, the CPU 9 starts processing in a case where the power supply is turned on in the state on arrival.

In S612, the CPU 9 determines whether the cover 3 is open. If the cover 3 is open, the processing proceeds to S613, and, if the cover 3 is not open, the determination of S612 is repeated. In S613, the CPU 9 displays the cover-opened screen on the LCD 7. In FIG. 7A, an example of the cover-opened screen is illustrated. On the LCD 7, a notification that the cover is open is provided. Thereafter, the processing proceeds to S614.

In S614, the CPU 9 performs the control for moving the print head 1 to the tank replacement position. That is, via the motor driver 16, the CPU 9 controls the carriage motor 17 that drives the carriage 8 on which the print head 1 is mounted, so as to move the print head 1 from the standby position to the tank replacement position.

After moving the print head 1 to the tank replacement position in S614, the CPU 9 displays a tank insertion screen on the LCD 7 in S615. In FIG. 7B, an example of the tank insertion screen is illustrated. In FIG. 7B, a notification for guidance of inserting (mounting) a tank is provided. Upon displaying the tank insertion screen in S615, the ink tank 2 is to be inserted by the user. Thereafter, in S616, the CPU 9 determines whether the cover 3 is closed. If the cover 3 is closed, the processing proceeds to S617. If the cover is not closed, the determination is repeated in S616. During the determination of S616, the screen illustrated in FIG. 7B is kept being displayed on the LCD 7. In S617, the CPU 9 performs the control for moving (returning) the print head 1 to the home position, which is the standby position. Although explanation is omitted in the present flowchart, in a case where an appropriate ink tank 2 is not attached, a screen for a notification thereof can be displayed on the LCD 7. Upon returning the print head to the standby position in S617, the processing proceeds to S618, so as to end the processing of the present flowchart.

As explained above, the only use case to be assumed in a case where the user opens the cover 3 in the state on arrival is ink tank insertion. That is, since the ink tank 2 is not mounted, it is not necessary to assume that the ink tank 2 is replaced. Therefore, in the state on arrival, the control for moving the print head 1 to the tank replacement position is performed if the user opens the cover 3. That is, the control for moving the print head 1 to the tank replacement position is performed without a predetermined key operation. According to such control, the user is not requested for performing an unnecessary key operation, so that the usability can be improved.

As explained above, according to the present embodiment, notification and control for ink tank replacement can be performed in an appropriate state for replacement. For example, if the cover 3 is opened, a guidance screen for shifting to a replaceable state is displayed only in a state where the ink tank 2 can be replaced. Further, on the guidance screen, a notification for guidance of a predetermined key operation is displayed. As a result, the user can surely perform the replacement work according to the screen, so that the usability can be improved.

Other Embodiments

In the explanation of the above-described embodiment, the printing apparatus using a serial scanning type print head capable of performing reciprocal movement in a predetermined direction is taken as an example. Further, the example in which the print head moves to the standby position and to the tank replacement position, which is a position of a replacement state in which ink can be replaced, is explained. However, the present embodiment is not limited to this example. The above-described embodiment can be applied to various printing apparatuses with such a system in which an ink tank that contains ink for printing is mounted for use. That is, the above-described embodiment can be applied to a printing apparatus with such a form in which, in a case where a predetermined cover is opened, replacement of a tank becomes possible in response to a predetermined key operation. For example, it is also possible to use a printing apparatus on which an ink tank for supplying ink to what is termed as a line-type print head, in which ejection ports of the print head extend in the width direction of the print medium, is mounted. It is possible to apply the processing of the above-described embodiment even to a printing apparatus with such a form as long as the printing apparatus is configured so that, in a case where a predetermined cover is opened, replacement of a tank becomes possible in response to a predetermined key operation. That is, it is only necessary to perform such control that, if a predetermined cover is opened, a guidance screen for prompting a predetermined key operation is displayed in a state where an ink tank can be replaced and, in response to the key operation, the printing apparatus is shifted to a state in which the tank can be replaced.

Further, the printing apparatus need not include an LCD, and it is also possible that the guidance screen is displayed on a display device (for example, a PC, smartphone, etc.) connected to the printing apparatus. Moreover, it is not necessary that a pigment ink is mounted on the printing apparatus.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-082441, filed May 8, 2020, which is hereby incorporated by reference herein in its entirety.

What is claimed is:

1. A printing apparatus comprising:

a print head on which an ink tank containing ink to be used for printing is mounted, the print head being reciprocally movable in a predetermined direction;

a cover configured to cover a moving area of the print head while printing is performed by the print head;

an operation unit configured to accept a user operation; and a control unit configured (a) to display a first screen on a display unit based on the cover being opened and the print head being movable, (b) not to move the print head to a position in which the ink tank is replaced until the operation unit is operated in a state where the first screen is displayed on the display unit, (c) to move the print head to the position in which the ink tank is replaced after the operation unit is operated in a state where the first screen is displayed on the display unit, and (d) to display a second screen different from the first screen on the display unit based on the cover being opened and the print head not being movable.

2. The printing apparatus according to claim 1, wherein the first screen includes a notification for guiding a user to operate a predetermined key in the operation unit, and wherein after the predetermined key is operated in a state where the first screen is displayed on the display unit, the control unit moves the print head to the position in which the ink tank is replaced.

3. The printing apparatus according to claim 1, wherein the control unit is configured to display on the display unit the second screen for guidance of a user operation for closing the cover based on opening of the cover in a case where the ink tank cannot be replaced.

4. The printing apparatus according to claim 3, wherein the control unit is configured (a) to suspend a current operation if the second screen is displayed on the display unit and (b) to resume the suspended operation based on closing of the opened cover.

5. The printing apparatus according to claim 3, wherein the control unit is configured to determine that the ink tank cannot be replaced in a case where the printing apparatus is in operation or under maintenance.

6. The printing apparatus according to claim 1, wherein the control unit is configured to display the first screen on the display unit based on opening of the cover in a case where the printing apparatus is on standby.

7. The printing apparatus according to claim 1, wherein in a case where the printing apparatus is in a state on arrival, the control unit is configured to move the print head to the position in which the ink tank is replaced without displaying the first screen on the display unit in response to opening of the cover.

8. The printing apparatus according to claim 7, wherein, in the case where the printing apparatus is in the state on arrival, the control unit is configured to display, instead of the first screen, a screen for guidance of a user operation for mounting an ink tank on the display unit in response to opening of the cover.

9. The printing apparatus according to claim 1, wherein the control unit performs control for moving the print head to the position in which the ink tank is replaced after the operation unit is operated in a state where the first screen is displayed on the display unit.

10. The printing apparatus according to claim 1, wherein the control unit displays a predetermined screen on the display unit in response to opening of the cover, and displays the first screen after displaying the predetermined screen.

11. The printing apparatus according to claim 1, wherein the position in which the ink tank is replaced corresponds to a position in which the print head is not capped.

12. The printing apparatus according to claim 1, wherein a plurality of ink tanks can be mounted on the print head, and wherein a pigment ink is contained in at least one of the plurality of ink tanks.

13. The printing apparatus according to claim 1, wherein the operation unit includes a key to be operated and the display unit.

14. A control method of a printing apparatus, the printing apparatus comprising (a) a print head on which an ink tank containing ink to be used for printing is mounted, the print head being reciprocally movable in a predetermined direction, (b) a cover configured to cover a moving area of the print head while printing is performed by the print head, and (c) an operation unit configured to accept a user operation, the control method comprising:

displaying a first screen on a display unit based on the cover being opened and the print head being movable;

not moving the print head to a position in which the ink tank is replaced until the operation unit is operated in a state where the first screen is displayed on the display unit;

moving the print head to the position in which the ink tank is replaced after the operation unit is operated in a state where the first screen is displayed on the display unit; and displaying a second screen different from the first screen on the display unit based on the cover being opened and the print head not being movable.

15. A non-transitory computer-readable storage medium storing a program which causes a computer to execute a control method of a printing apparatus, the printing apparatus comprising (a) a print head on which an ink tank containing ink to be used for printing is mounted, the print head being reciprocally movable in a predetermined direction, (b) a cover configured to cover a moving area of the print head while printing is performed by the print head, and (c) an operation unit configured to accept a user operation, the control method comprising:

displaying a first screen on a display unit based on the cover being opened and the print head being movable;

not moving the print head to a position in which the ink tank is replaced until the operation unit is operated in a state where the first screen is displayed on the display unit;

moving the print head to the position in which the ink tank is replaced after the operation unit is operated in a state where the first screen is displayed on the display unit; and displaying a second screen different from the first screen on the display unit based on the cover being opened and the print head not being movable.

* * * * *